(12) United States Patent
Katsura

(10) Patent No.: US 10,220,915 B2
(45) Date of Patent: Mar. 5, 2019

(54) BICYCLE BAR END ATTACHMENT

(71) Applicant: Shimano Inc., Sakai, Osaka (JP)

(72) Inventor: Takafumi Katsura, Osaka (JP)

(73) Assignee: Shimano Inc., Osaka (JP)

( * ) Notice: Subject to any disclaimer, the term of this patent is extended or adjusted under 35 U.S.C. 154(b) by 220 days.

(21) Appl. No.: 15/419,634

(22) Filed: Jan. 30, 2017

(65) Prior Publication Data

US 2017/0369125 A1 Dec. 28, 2017

(30) Foreign Application Priority Data

Jun. 28, 2016 (JP) .................. 2016-127719

(51) Int. Cl.
| | |
|---|---|
| *B62M 25/08* | (2006.01) |
| *B62K 23/02* | (2006.01) |
| *B62J 1/08* | (2006.01) |
| *B62K 25/04* | (2006.01) |
| *B62M 6/55* | (2010.01) |
| *B62M 6/45* | (2010.01) |
| *B62J 99/00* | (2009.01) |

(52) U.S. Cl.
CPC ............. *B62M 25/08* (2013.01); *B62J 1/08* (2013.01); *B62K 23/02* (2013.01); *B62K 25/04* (2013.01); *B62M 6/45* (2013.01); *B62M 6/55* (2013.01); *B62J 2001/085* (2013.01); *B62J 2099/0013* (2013.01)

(58) Field of Classification Search
CPC ........ B62K 23/00; B62K 23/02; B62K 23/04; B62M 25/08
See application file for complete search history.

(56) References Cited

U.S. PATENT DOCUMENTS

| | | | |
|---|---|---|---|
| 5,285,696 A | 2/1994 | Taylor | |
| 7,565,848 B2 * | 7/2009 | Fujii ................ | B62K 23/02 |
| | | | 74/473.12 |
| 9,821,884 B2 * | 11/2017 | Katsura ............. | B62M 25/08 |
| 2006/0032326 A1 | 2/2006 | Griswold | |
| 2009/0235772 A1 | 9/2009 | Naka et al. | |
| 2011/0011197 A1 | 1/2011 | Oku et al. | |

(Continued)

FOREIGN PATENT DOCUMENTS

EP 1 582 452 A2 10/2005

*Primary Examiner* — Kevin Hurley
(74) *Attorney, Agent, or Firm* — Global IP Counselors, LLP

(57) ABSTRACT

A bicycle bar end attachment includes a main body, a shoe, a compression member, a rotation member, a transmission structure and a fixing structure. The main body is insertable into a bicycle handlebar, and includes a first threaded portion. The shoe is located between an inner surface of the handlebar and the main body. The compression member includes a second threaded portion engaged with the first threaded portion and a first pressing surface contacting one end of the shoe. The rotation member includes an exposed portion accessible from outside the handlebar and a second pressing surface contacting the other end of the shoe. The transmission structure transmits rotation of the rotation member to the compression member. The fixing structure holds the shoe between the compression member and the rotation member, and moves the shoe in a radial direction of the handlebar to fix the main body to the handlebar.

17 Claims, 5 Drawing Sheets

(56) References Cited

U.S. PATENT DOCUMENTS

2011/0048161 A1   3/2011   Shipman
2013/0333994 A1   12/2013  Jordan et al.
2017/0080993 A1*  3/2017   Bierwerth .............. B62M 25/08

* cited by examiner

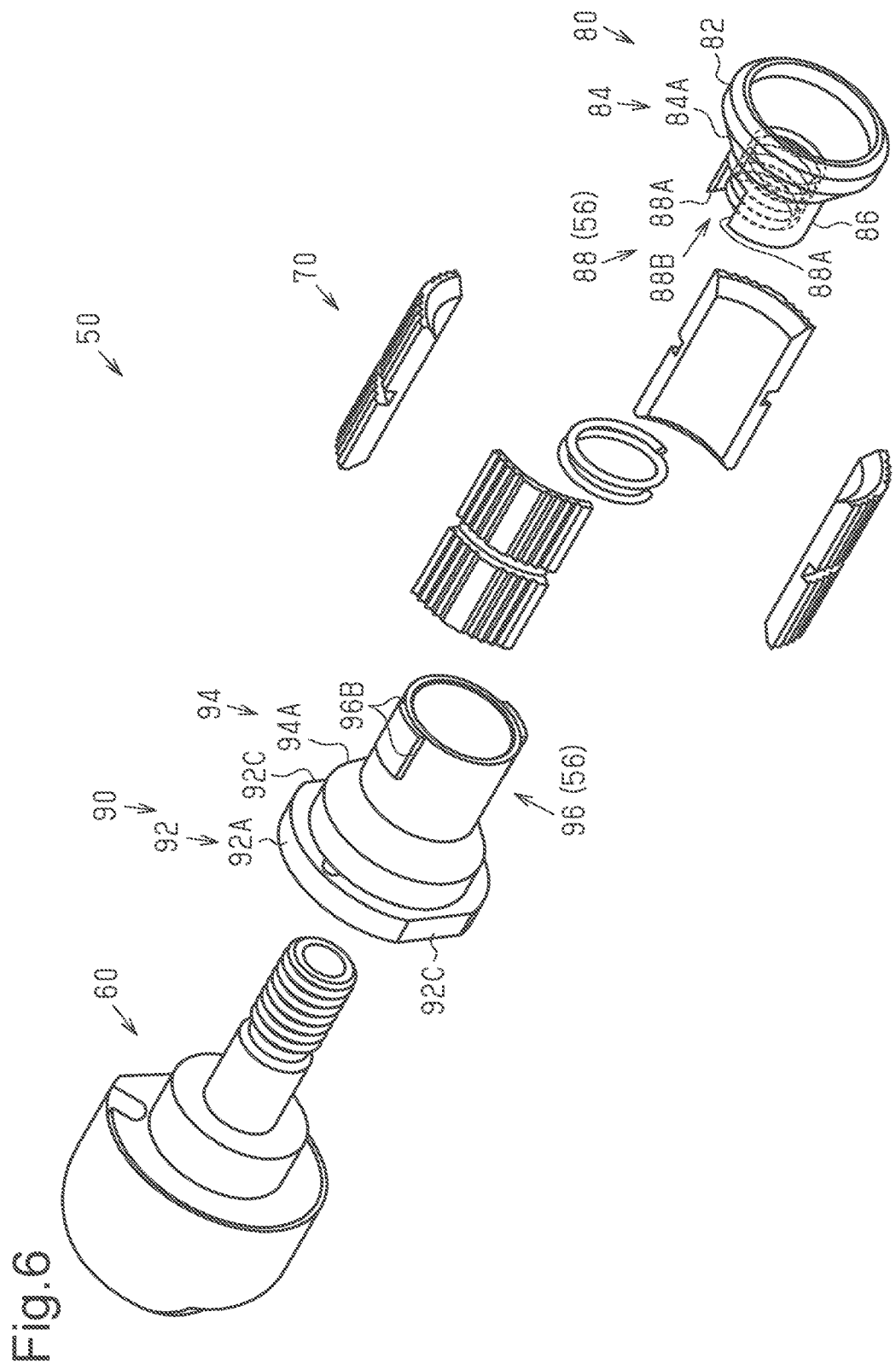

BICYCLE BAR END ATTACHMENT

CROSS-REFERENCE TO RELATED APPLICATIONS

This application claims priority to Japanese Patent Application No. 2016-127719, filed on Jun. 28, 2016. The entire disclosure of Japanese Patent Application No. 2016-127719 is hereby incorporated herein by reference.

BACKGROUND

Field of the Invention

The present invention generally relates to a bicycle bar end attachment.

Background Information

Bicycle bar end attachments are fixed to the ends of a bicycle handlebar. One example of a bicycle bar end attachment is disclosed in U.S. Patent Application Publication No. 2009/0235772 (Patent document 1). In this patent publication, the bicycle bar end attachment is a bicycle bar end shifter that is fixed to a handlebar by compressing a shoe with a compression member and then pressing the shoe against an inner surface of the handlebar.

When removing or attaching the bicycle bar end shifter, the end of the bicycle bar end shifter needs to be removed from the main body of the bicycle bar end shifter so that a tool can be inserted into the bicycle bar end shifter.

SUMMARY

One object of the present invention is provided a bicycle bar end attachment that reduces the burden on the person performing a task of attachment and removal of the bicycle bar end attachment. Thus, it is desirable to provide a bicycle bar end attachment in which the attachment and removal of the bicycle bar end attachment is simplified.

A first aspect of the present invention is a bicycle bar end attachment including a main body, a shoe, a compression member, a rotation member, a transmission structure and a fixing structure. The main body is configured to be partially inserted into a handlebar of a bicycle. The main body includes a first threaded portion. The shoe is configured to be located between the main body and an inner surface of the handlebar while the main body is partially inserted into the handlebar. The shoe includes a first end and a second end. The compression member includes a second threaded portion that is threadedly engaged with the first threaded portion and a first pressing surface that contacts the first end of the shoe. The rotation member is rotatably arranged relative to the main body and coaxial to the main body. The rotation member includes an exposed portion that is accessible from outside the handlebar and a second pressing surface that contacts the second end of the shoe. The transmission structure is arranged to transmit rotation of the rotation member to the compression member. The fixing structure arranged to hold the shoe between the compression member and the rotation member and moves the shoe in a radial direction of the handlebar to allow the main body to be fixed to the inner surface of the handlebar.

The exposed portion is exposed from the bicycle bar end attachment. This allows the rotation member to be rotated with a tool without removing an element of the bicycle bar end attachment from the main body of the bicycle bar end attachment.

In a second aspect of the present invention according to the bicycle bar end attachment of the preceding aspect, the first threaded portion of the main body includes a male thread, and the second threaded portion of the compression member includes a female thread that is engageable with the male thread of the first threaded portion.

When engaged with the main body, the compression member is rotated to decrease the distance between the compression member and the main body. This compresses the shoe located between the compression member and the main body.

In a third aspect of the present invention according to the bicycle bar end attachment of any one of the preceding aspects, the first pressing surface includes a first tapered surface that is inclined relative to an axis of the handlebar.

Thus, movement of the compression member in the direction in which the first pressing surface is pressed against the shoe smoothly moves the shoe in the radial direction of the handlebar.

In a fourth aspect of the present invention according to the bicycle bar end attachment of any one of the preceding aspects, the second pressing surface includes a second tapered surface that is inclined relative to an axis of the handlebar.

Thus, movement of the compression member in the direction in which the second pressing surface is pressed against the shoe smoothly moves the shoe in the radial direction of the handlebar.

In a fifth aspect of the present invention according to the bicycle bar end attachment of any one of the preceding aspects, the transmission structure includes a transmitted portion arranged in the compression member and a transmitting portion arranged in the rotation member. The transmitted portion includes a first restriction surface. The transmitting portion includes a second restriction surface that opposes the first restriction surface in a rotation direction of the rotation member.

The first restriction surface of the transmitted portion contacts the second restriction surface of the transmitting portion to transmit the rotation of the rotation member to the compression member and rotate the compression member.

In a sixth aspect of the present invention according to the bicycle bar end attachment of any one of the preceding aspects, the transmitted portion projects from the first pressing surface in an axial direction of the compression member. Further, the transmitting portion includes a slit into which the transmitted portion is inserted.

Thus, the transmitted portion and the transmitting portion can easily be coupled to each other when assembling the bicycle bar end attachment.

In a seventh aspect of the present invention according to the bicycle bar end attachment of any one of the preceding aspects, the transmitted portion includes a slit into which the transmitting portion is inserted. Further, the transmitted portion projects from the second pressing surface in an axial direction of the rotation member.

Thus, the transmitted portion and the transmitting portion can easily be coupled to each other when assembling the bicycle bar end attachment.

In an eighth aspect of the present invention according to the bicycle bar end attachment of any one of the preceding aspects, the transmission structure is configured to relatively move the compression member and the rotation member in an axial direction of the compression member and the rotation member.

Relative movement of the compression member and the rotation member in the axial direction presses the first pressing surface against the first end of the shoe and presses the second pressing surface against the second end of the shoe. Contact of each pressing surface with the shoe moves the shoe in the axial direction of the handlebar and fixes the main body to the inner surface of the handlebar in a suitable manner.

In a ninth aspect of the present invention according to the bicycle bar end attachment of any one of the preceding aspects, the main body includes an operation unit, which operates a bicycle component coupled to the bicycle.

When the operation unit is coupled to the main body, the distance is short between the handlebar and the operation unit. This allows the rider to operate the operation unit with ease.

In a tenth aspect of the present invention according to the bicycle bar end attachment of any one of the preceding aspects, the operation unit includes a circuit board.

The circuit board generates electric signals to operate the bicycle component.

In an eleventh aspect of the present invention according to the bicycle bar end attachment of any one of the preceding aspects, the circuit board is configured to transmit a wireless signal.

Thus, electric wires connecting the bicycle component and the circuit board can be omitted.

In a twelfth aspect of the present invention according to the bicycle bar end attachment of any one of the preceding aspects, the operation unit is configured to be connected to the bicycle component by a wire.

The bicycle component can be operated physically by a steel wire, electrically by an electric wire, or optically by an optical fiber.

In a thirteenth aspect of the present invention according to the bicycle bar end attachment of any one of the preceding aspects, the main body includes a tubular portion, and the first threaded portion is arranged on the tubular portion.

Thus, an element of the operation unit or the like can be accommodated in a space in the tubular portion.

A fourteenth aspect of the present invention according to the bicycle bar end attachment of any one of the preceding aspects further includes an electronic component electrically connected to the wire. The main body includes a tubular portion. Further, the electronic component is arranged in a space in the tubular portion.

Thus, the electronic component is protected by the tubular portion.

A fifteenth aspect of the present invention is a bicycle bar end attachment including a main body, a shoe, a compression member, a tubular portion and an electronic component. The main body is configured to be partially inserted into a handlebar of a bicycle. The main body includes a first threaded portion and an operation unit, which operates a bicycle component coupled to the bicycle. The shoe is configured to be located between the main body and an inner surface of the handlebar to fix the main body to the handlebar while the main body is partially inserted into the handlebar. The compression member includes a second threaded portion that is threadedly engaged with the first threaded portion. The tubular portion is arranged on one of the main body and the compression member. The electronic component is electrically connected to the operation unit. The electronic component is arranged in a space in the tubular portion. The shoe is pressed against an inner surface of the handlebar in accordance with a degree of engagement of the main body and the compression member.

Thus, the electronic component is protected by the tubular portion.

In a sixteenth aspect of the present invention according to the bicycle bar end attachment of any one of the preceding aspects, the first threaded portion of the main body includes a male thread. Further, the second threaded portion of the compression member includes a female thread that is threadedly engaged with the male thread of the first threaded portion.

When engaged with the main body, the compression member is rotated to decrease the distance between the compression member and the main body. This compresses the shoe located between the compression member and the main body.

In a seventeenth aspect of the present invention according to the bicycle bar end attachment of any one of the preceding aspects, the bicycle component includes at least one of a gear changer, a suspension, an adjustable seatpost, a power assist unit and a cycle computer.

This allows for the execution of at least one of gear changing, damping ratio adjustment, seat height adjustment, bicycle pedaling assistance and cycle computer operation.

The bicycle bar end attachment according to the present invention simplifies attachment and removal.

BRIEF DESCRIPTION OF THE DRAWINGS

FIG. 6 is an exploded perspective view showing a bicycle bar end attachment of a modified example.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
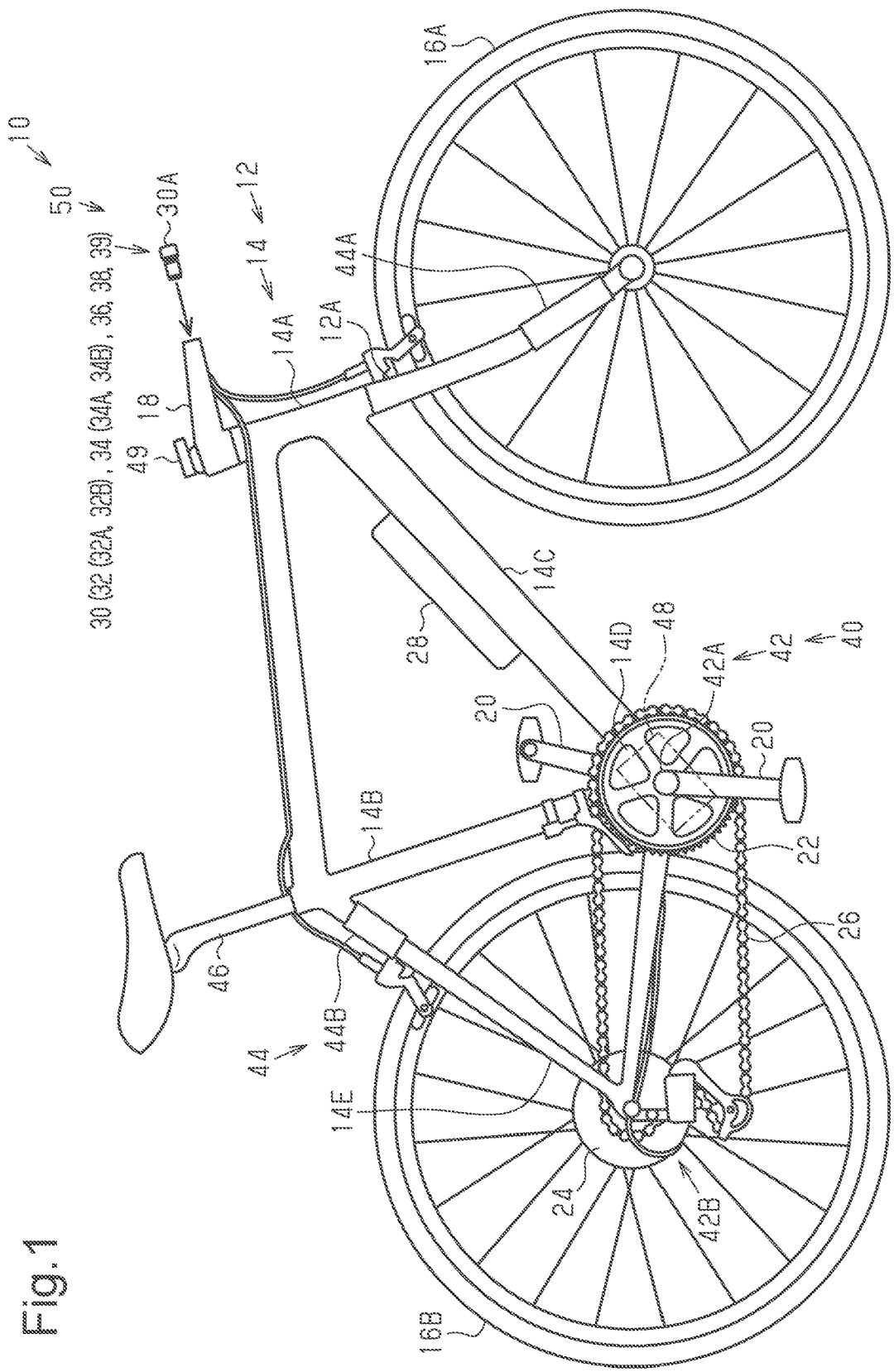
FIG. 1 is a side elevational view of a bicycle including a bicycle bar end attachment of one embodiment.

As shown in FIG. 1, a bicycle bar end attachment 50 (hereinafter referred to as "the bar end attachment 50") is coupled to a bicycle 10. Here, the bicycle bar end attachment 50 is a bicycle bar end control device 50. The type of the bicycle 10 can be, for example, a mountain bicycle, a road racing bicycle, or a cross bicycle. The type of the bicycle 10 to which the bar end attachment 50 is coupled is not limited to the examples given above. The bar end attachment 50 can be coupled to any type of bicycle. In addition to the bar end attachment 50, the bicycle 10 includes a bicycle body 12, a front wheel 16A, a rear wheel 16B, a handlebar 18, a crank 20, a front sprocket 22, a rear sprocket 24, a chain 26, a battery 28, an operation unit 30 and a bicycle component 40.

The bicycle component 40 is coupled to the bicycle 10. For example, the bicycle component 40 includes a gear changer 42, a suspension 44, an adjustable seatpost 46, a power assist unit 48 and a cycle computer 49. The gear changer 42 includes a front gear changer 42A and a rear gear changer 42B. The front gear changer 42A is, for example, hub gear or a derailleur. The rear gear changer 42B is formed by, for example, a hub gear or a derailleur. The suspension 44 includes a front suspension 44A and a rear suspension 44B.

The bicycle body 12 includes a front fork 12A and a frame 14. The frame 14 includes a head tube 14A, a seat tube 14B, a down tube 14C, a bottom bracket 14D and a rear end 14E. The front wheel 16A is coupled to the front fork 12A. The rear wheel 16B is coupled to the rear end 14E. The handlebar 18 is coupled to a head tube 14A. In the example shown in FIG. 1, the handlebar 18 is coupled to the head tube 14A so that the ends of the handlebar 18 extend toward the front. of the bicycle 10. The crank 20 is coupled to the bottom bracket 14D. The front sprocket 22 is coupled to the crank 20. The rear sprocket 24 is coupled to the rear wheel 16B. The chain 26 runs around the front sprocket 22 and the rear sprocket 24, The battery 26 is coupled to the down tube 14C. The battery 28 supplies power to at least the bicycle component 40. The battery 28 is connected by a wire (not shown) to the bicycle component 40 that is driven by the power. The front suspension 44A is arranged on the front fork 12A. The rear suspension 44B is located between the seat tube 14B and the rear end 14E. The adjustable seatpost 46 is arranged on the seat tube 14B.

The crank 20 is rotated by human power that is applied by a rider. The front sprocket 22 is rotated together with the crank 20. The chain 26 transmits the rotation of the front sprocket 22 to the rear sprocket 24. This rotates the rear sprocket 24 and the rear wheel 16B.

The bicycle component 40 can be operated by the operation unit 30. In one example, the operation unit 30 includes a first operation unit 32, a second operation unit 34, a third operation unit 36, a fourth operation unit 38 and a fifth operation unit 39. Any of a variety of power supplies can be used to operate the operation unit 30. In a first example, the operation unit 30 incorporates a battery (not shown) and is operated by the electromotive force of the battery. The battery is, for example, a lithium-ion battery or a dry battery. In a second example, the operation unit 30 incorporates a power generation mechanism including a solar battery (not shown) or a piezoelectric element (not shown), and the operation unit 30 is operated by the electric power generated by the power generation mechanism. In a third example, the operation unit 30 is operated by the electric power supplied from the battery 28.

The operation unit 30 includes a button 30A. The button 30A is used to change operations of the bicycle component 40. In the example shown in FIG. 1, one example of the bicycle component 40 that is the subject operated by the operation unit 30 is the rear gear changer 42B. While the operation unit 30 of the bicycle component 40 can include all of the first to fifth operation units 32, 34, 36, 38 and 39 so as to operate various components of the bicycle 10, as mentioned above, the operation unit 30 can include only one of the first to fifth operation units 32, 34, 36, 38 and 39. In the situation that the operation unit 30 includes two or more of the first to fifth operation units 32, 34, 36, 38 and 39, the case 52 can be made larger than illustrated so as include two or more buttons, such as button 30A, to operate the operation units 32, 34, 36, 38 and/or 39, or a system unit can be electrically coupled to the operation unit 30 to change a mode of the operation unit between the first to fifth operation units 32, 34, 36 and 39 based on a user setting. The first operation unit 32 is the operation unit 30 for operating the gear changer 42. The second operation unit 34 is the operation unit 30 for operating the suspension 44. The third operation unit 36 is the operation unit 30 for operating the adjustable seatpost 46. The fourth operation unit 38 is an operation unit 30 for operating the power assist unit 48. The fifth operation unit 39 is the operation unit 30 for operating the cycle computer 49. In a further example, the operation unit 30 includes at least one of the first operation unit 32, the second operation unit 34, the third operation unit 36, the fourth operation unit 38 and the fifth operation unit 39.

Figure 4:
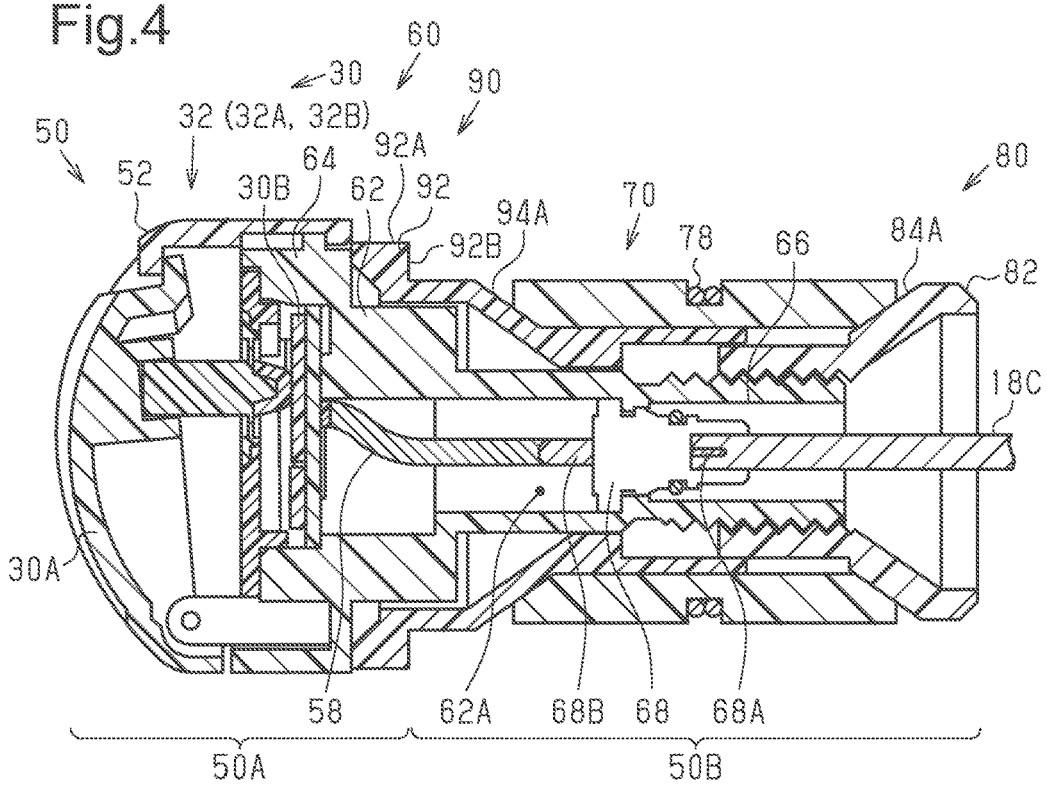
FIG. 4 is a longitudinal cross-sectional view of the bicycle bar end attachment shown in FIGS. 1 to 3 as seen along section line 4-4 in FIG. 2.

The operation unit 30 is connected to the bicycle component 40 by a wire 18C (refer to FIG. 4). The wire 18C includes, for example, an electric cable that allows for the transmission of electric signals. The operation unit 30 includes a circuit board 30B (refer to FIG. 4). The circuit board 30B is connected to the bicycle component 40 in a communicable manner. The circuit board 30B is configured to transmit signals including control signals. The control signals include information for controlling the bicycle component 40.

A front suspension operator 34A is connected to the front suspension 44A in a manner allowing for wire communication. A rear suspension operator 34B is connected to the rear suspension 44B in a manner allowing for wire communication or wireless communication. The third operation unit 36 is connected to the adjustable seatpost 46 in a manner allowing for wireless communication. The fourth operation unit 38 is connected to the power assist unit 48 in a manner allowing for wire communication.

The first operation unit 32 includes a front gear changer operator 32A and a rear gear changer operator 32B. The front gear changer operator 32A and the rear gear changer operator 32B are devices for respectively operating the front gear changer 42A and the rear gear changer 42B. Further, the front gear changer operator 32A and the rear gear changer operator 32B are coupled to, for example, the handlebar 18 via the bicycle bar end attachment 50. Thus, the bicycle bar end attachment 50 constitutes a bicycle bar end shifter 50 when the first operation unit 32 includes at least one of the front gear changer operator 32A and the rear gear changer operator 32B. When the rider inputs a shift-up command to the first operation unit 32, the gear changer 42 changes gears to increase the gear ratio of the bicycle 10. When the rider inputs a shift-down command to the first operation unit 32, the gear changer 42 changes gears to decrease the gear ratio of the bicycle 10.

The front gear changer operator 32A and the rear gear changer operator 32B are able to establish a data link with the gear changer 42 to transmit and receive a data set. The front gear changer operator 32A, the rear gear changer operator 32B, the front gear changer 42A, and the rear gear changer 42B each include a transmission-reception circuit. The front gear changer operator 32A and the front gear changer 42A transmit and receive a data set through the established data link. The rear gear changer operator 32B and the rear gear changer 42B transmit and receive a data set through the established data link. Examples of a data set include information indicating the state of the gear changer 42 and information used to control the gear changer 42.

The second operation unit 34 includes the front suspension operator 34A and the rear suspension operator 34B. The front suspension operator 34A and the rear suspension operator 34B are devices for respectively operating the front suspension 44A and the rear suspension 44B. Further, the front suspension operator 34A and the rear suspension operator 34B are coupled to, for example, the handlebar 18. When the rider inputs a lockout command to the front suspension operator 34A, the front suspension 44A locks so that the front wheel 16A remains in position relative to the front fork 12A. When the rider inputs an open command to the front suspension operator 34A, the front suspension 44A unlocks so that the position of the front wheel 16A can be changed relative to the front fork 12A. The rear suspension operator 34B is operated in the same manner as the front suspension operator 34A. When the rear suspension operator 34B is operated, the rear suspension 44B functions in the same manner as the front suspension 44A when the front suspension operator 34A is operated.

The front suspension 44A and the front suspension operator 34A are able to establish a data link with each other to transmit and receive a data set. The rear suspension 44B and the rear suspension operator 34B are able to establish a data link with each other to transmit and receive a data set. The data link is established in the same manner as the data link of the gear changer 42 and the first operation unit 32.

The third operation unit 36 is a device for operating the adjustable seatpost 46. The third operation unit 36 is coupled to, for example, the handlebar 18 via the bar end attachment 50. When the rider inputs a raising command to the third operation unit 36, the adjustable seatpost 46 is increased in height relative to the frame 14. When the rider inputs a lowering command to the third operation unit 36, the adjustable seatpost 46 is decreased in height relative to the frame 14.

The adjustable seatpost 46 and the third operation unit 36 are able to establish a data link with each other to transmit and receive a data set. The data link is established in the same manner as the data link of the gear changer 42 and the first operation unit 32.

The power assist unit 48 includes an assist motor (not shown). The power assist unit 48 assists the rotation of the crank 20 with the assist motor. One example of the assist motor is an electric motor.

The fourth operation unit 38 is a device for operating the power assist unit 48. The fourth operation unit 38 is coupled to, for example, the handlebar 18 via the bar end attachment 50. The power assist unit 48 is operated in a number of modes. In one example, the modes include a normal mode and an eco-mode. The fourth operation unit 38 is operated to switch the modes of the power assist unit 48. The upper limit of the assist motor output is set in accordance with the mode set by the fourth operation unit 38. The upper limit of the assist motor output when the normal mode is set is higher than the upper limit of the assist motor output when the eco-mode is set.

The power assist unit 48 and the fourth operation unit 38 are able to establish a data link with each other to transmit and receive a data set. The data link is established in the same manner as the data link of the gear changer 42 and the first operation unit 32.

The fifth operation unit 39 is a device for operating the cycle computer 49. The fifth operation unit 39 is coupled to, for example, the handlebar 18 via the bar end attachment 50. When the rider inputs an ON command to the fifth operation unit 39, the cycle computer 49 is powered on. When the rider inputs an OFF command to the fifth operation unit 39, the cycle computer 49 is powered off. The cycle computer 49 is operated in a number of display modes. In one example, the display modes include a speed display mode, a riding distance mode, and a riding time mode. When the rider inputs a command for switching display modes to the fifth operation unit 39, the cycle computer 49 switches the display mode.

The cycle computer 49 and the fifth operation unit 39 are able to establish a data link with each other to transmit and receive a data set. The data link is established in the same manner as the data link of the gear changer 42 and the first operation unit 32.

Figure 2:
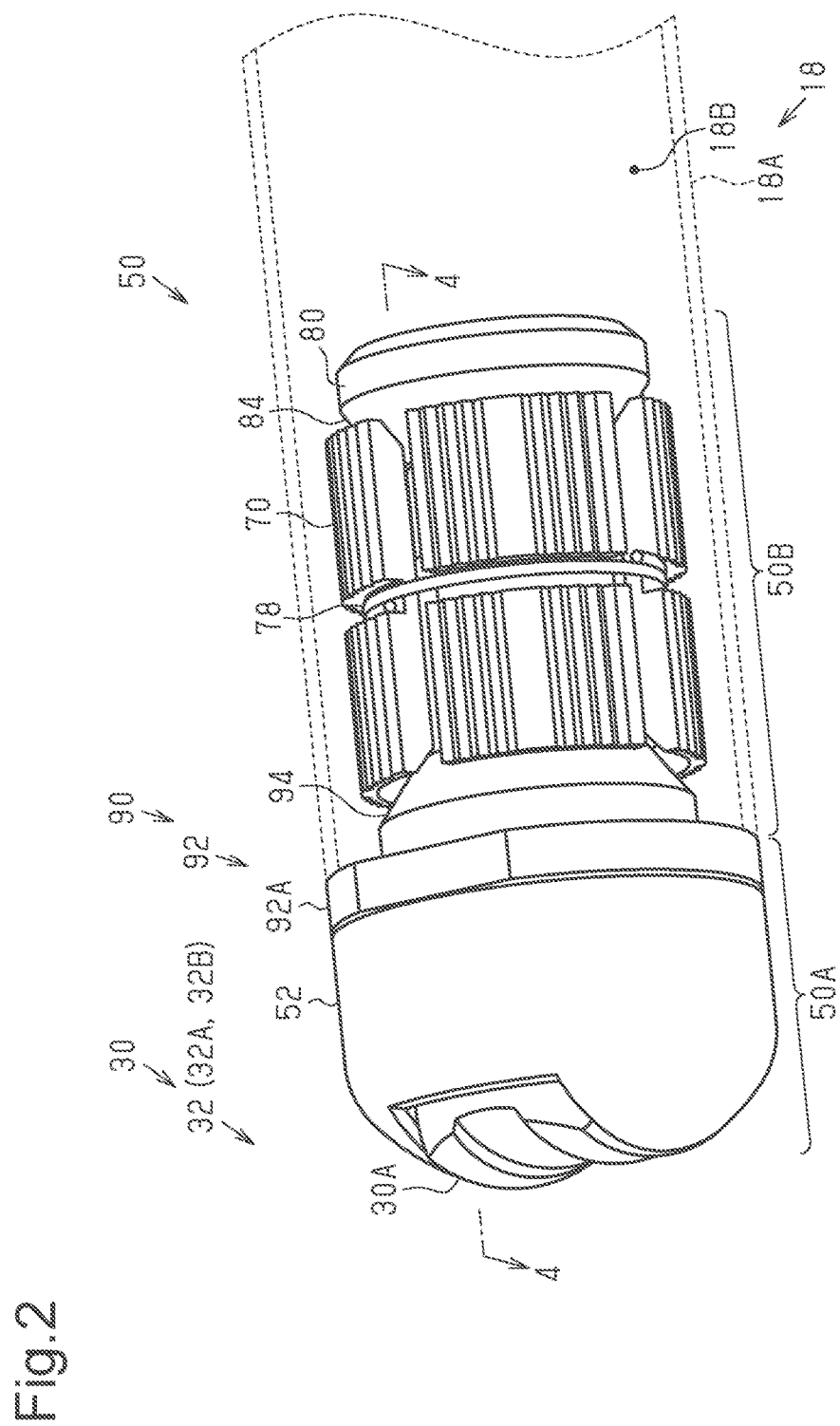
FIG. 2 is a perspective view of the bicycle bar end attachment shown in FIG. 1.
Figure 3:
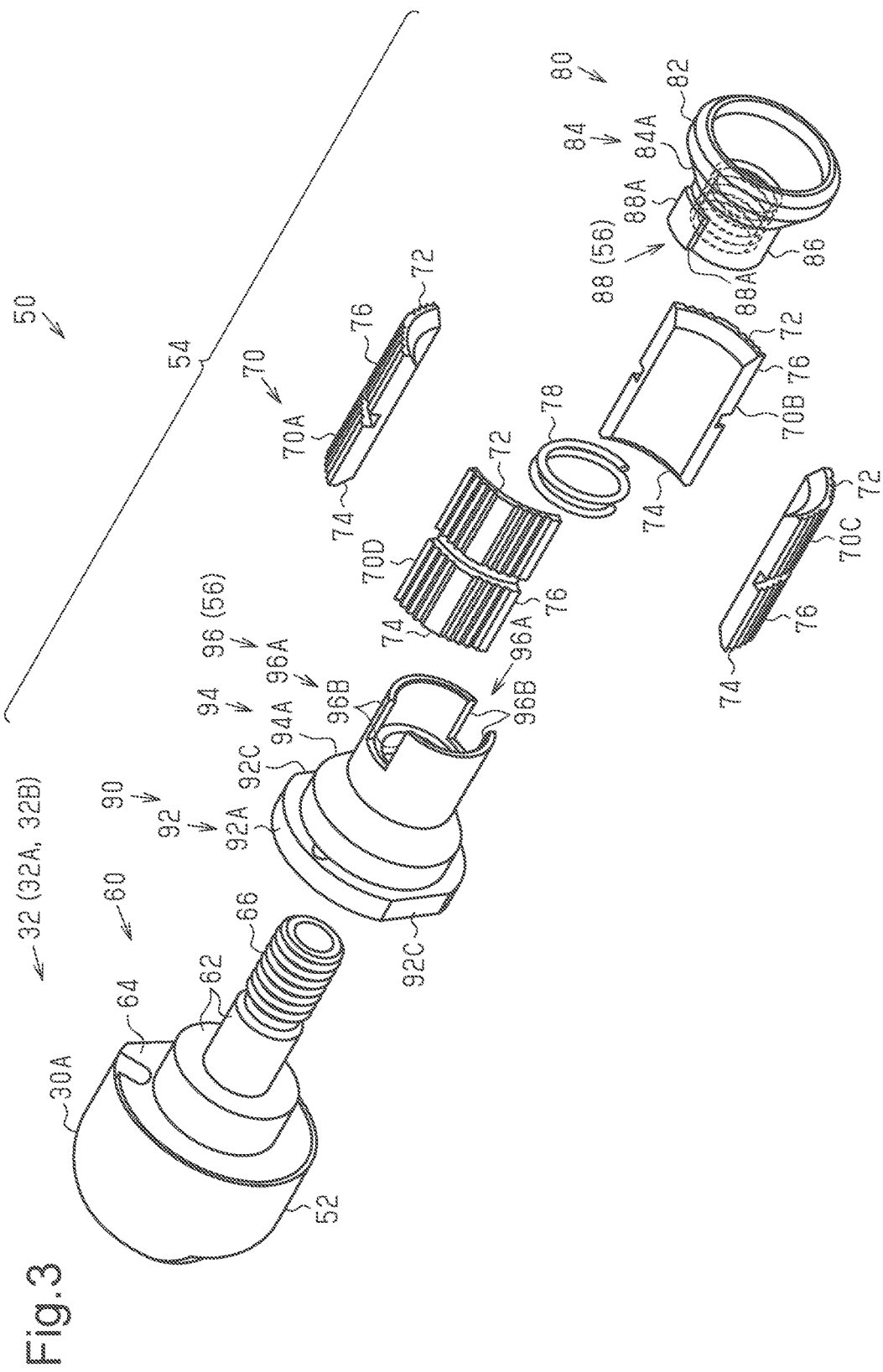
FIG. 3 is an exploded perspective view of the bicycle bar end attachment shown in FIG. 2.

With reference to FIGS. 2 and 3, the structures of the handlebar 18 and the bar end attachment 50 will now be described. FIG. 2 shows the bar end attachment 50 arranged on one of the left and right ends of the handlebar 18.

The bar end attachment 50 is configured to be partially insertable into the handlebar 18 of the bicycle 10. The handlebar 18 is, for example, a pipe and includes a receiving portion 18A. The receiving portion 18A includes at least the end of the handlebar 18. The receiving portion 18A includes an inner area 18B. A portion of the bar end attachment 50 is receivable in the inner area 18B. The bar end attachment 50 includes a first portion 50A and a second portion 50B. When the bar end attachment 50 is coupled to the handlebar 18, the first portion 50A is located outside the handlebar 18. When the bar end attachment 50 is coupled to the handlebar 18, the second portion 50B is located in the receiving portion 18A of the handlebar 18.

The bar end attachment 50 includes a case 52, a main body 60 (refer to FIG. 3), a shoe 70, a compression member 80 and a rotation member 90. The bar end attachment 50 includes a ring spring 78. In the example shown in FIG. 2, the bar end attachment 50 includes the first operation unit 32. The rotation member 90 includes an exposed portion 92A. The rotation member 90 is rotatable relative to the main body 60, which supports the case 52, and coaxial to the main body 60.

A person couples the bar end attachment 50 to the handlebar 18 by holding the case 52. The button 30A is an interface for operating the bicycle component 40. The interface of the bar end attachment 50 can have any structure. A further example of the interface is a lever. Moreover, the bar end attachment 50 does not necessarily have to include an interface.

The shoe 70 is used to fix the bar end attachment 50 to the handlebar 18. The shoe 70 is formed from, for example, resin or rubber. In one example, the shoe 70 includes a first piece 70A, a second piece 70B, a third piece 70C and a fourth piece 70D (refer to FIG. 3).

Referring to FIG. 3, the main body 60 supports the case 52. The main body 60 includes a first threaded portion 66. The first threaded portion 66 of the main body 60 includes a male thread. The main body 60 further includes a tubular portion 62. The tubular portion 62 includes the first threaded portion 66. The main body 60 also includes a coupling portion 64. In one example, the coupling portion 64 is disk-shaped and hollow. The operation unit 30 is arranged in the coupling portion 64, and is fixed to the coupling portion 64. The tubular portion 62 has a smaller diameter than the coupling portion 64. The tubular portion 62 and the coupling portion 64 are coaxial.

The bar end attachment 50 includes a fixing structure 54. The fixing structure 54 holds the shoe 70 between the compression member 80 and the rotation member 90, and moves the shoe 70 in the radial direction of the handlebar 18 to fix the main body 60 to the inner surface of the handlebar 18.

The shoe 70 is located between the inner surface of the handlebar 18 and the main body 60. The shoe 70 includes a first end 72, a second end 74 and an outer circumferential surface 76. In the axial direction of the first threaded portion 66 of the main body 60, the first end 72 is farther from the main body 60, and the second end 74 is closer to the main body 60. The outer circumferential surface 76 is located between the first end 72 and the second end 74.

The bar end attachment 50 includes a transmission structure 56. The transmission structure 56 is configured to transmit the rotation of the rotation member 90 to the compression member 80. The transmission structure 56 includes a transmitted portion 88 and a transmitting portion 96. The transmitted portion 88 is arranged in the compression member 80. The transmitting portion 96 is arranged in the rotation member 90.

The compression member 80 includes a compressing portion 82, a second threaded portion 86 and the transmitted portion 88. The compressing portion 82 includes a first pressing surface 84. The first pressing surface 84 is allowed to contact the first end 72 of the shoe 70. In one example, the first pressing surface 84 includes a first tapered surface 84A that is inclined relative to the axis of the handlebar 18. The first tapered surface 84A is inclined toward the outer side in the radial direction of the compression member 80 and away from the second threaded portion 86 in the axial direction of the compression member 80. The compressing portion 82 has the shape of a truncated cone. In a hither example, the first pressing surface 84 does not include the first tapered surface 84A. In such a case, the compressing portion 82 has the shape of a tube.

The second threaded portion 86 inwardly projects from the compressing portion 82 in the axial direction of the compression member 80. The second threaded portion 86 includes a female thread that is threadedly engaged with the first threaded portion 66. In one example, the second threaded portion 86 is tubular. The second threaded portion 86 and the compressing portion 82 can be arranged relative to each other in any manner. In a first example, the second threaded portion 86 is formed integrally with the compressing portion 82. In a second example, the second threaded portion 86 is separated from the compressing portion 82 and joined with the compressing portion 82 by a joining means. The joining means can be, for example, welding.

The transmitted portion 88 is defined by the outer circumference of the second threaded portion 86 and extends in the axial direction of the compression member 80. The transmitted portion 88 projects from the first pressing surface 84 in the axial direction of the compression member 80. The transmitted portion 88 includes two first restriction surfaces 88A.

The rotation member 90 includes a compressing portion 92, an exposed portion 92A and the transmitting portion 96. In one example, the exposed portion 92A and the transmitting portion 96 are tubular. The compressing portion 92 is coaxial to the exposed portion 92A and the transmitting portion 96. The compressing portion 92 is located at one of the axial ends of the rotation member 90. The transmitting portion 96 is located at the other axial end of the rotation member 90.

The compressing portion 92 includes a second pressing surface 94. The second pressing surface 94 is located between the exposed portion 92A and the transmitting portion 96. The second pressing surface 94 contacts the second end 74 of the shoe 70. The second pressing surface 94 includes a second tapered surface 94A that is inclined relative to the axis of the handlebar 18. The second tapered surface 94A is inclined toward the outer side in the radial direction of the rotation member 90 and toward the exposed portion 92A in the axial direction of the rotation member 90.

When the bar end attachment 50 is coupled to the handlebar 18, the exposed portion 92A is accessible with a tool from the outside of the handlebar 18. A tool can be engaged with the exposed portion 92A to rotate the rotation member 90. The tool is, for example, a wrench. The exposed portion 92A includes two opposing flat surfaces that define tool rest surfaces 92C. The tool rest surfaces 92C, which come into contact with the tool, differ from each other in the distance from the axis of the rotation member 90.

The transmitting portion 96 projects from the second pressing surface 94 in the axial direction of the rotation member 90. The transmitting portion 96 includes a slit 96A that into which the transmitted portion 88 is inserted. The transmitting portion 96 includes two second restriction surfaces 96B. The two second restriction surfaces 96B are located at opposite sides of the slit 96A. The second restriction surfaces 96B extend in the axial direction of the rotation member 90. When the transmitted portion 88 of the compression member 80 is inserted into the slit 96A, the second restriction. surfaces 96B are opposed to the first restriction surfaces 88A in the rotation direction of the rotation member 90.

FIG. 4 is a cross-sectional view showing the internal structure of the bar end attachment 50. The coupling portion 64 allows the operation unit 30, which operates the bicycle component 40 that is coupled to the bicycle 10, to be coupled to the main body 60. The tubular portion 62 further includes an electronic component 68. The electronic component 68 is arranged in a space 62A inside the tubular portion 62. In one example, the electronic component 68 is entirely arranged in the space 62A inside the tubular portion 62. One example of the electronic component 68 is a connector.

The bicycle 10 includes the wire 18C. The bar end attachment 50 further includes a lead wire 58. In the example shown in FIG. 4, the wire 18C is an electric wire. The electronic component 68 is electrically connected to the wire 18C. One end of the wire 18C is connected to a first terminal 68A of the electronic component 68. The other end of the wire 18C is electrically or physically connected to the bicycle component 40. One end of the lead wire 58 is connected to the circuit board 30B. The other end of the lead wire 58 is connected to a second terminal 68B of the electronic component 68.

There is not limitation to the type of the wire 18C. In a first example, the wire 18C is an electric wire. In this case, the bicycle component 40 includes an interface that is configured to receive electric signals. In a second example, the wire 18C is an optical fiber. In this case, the bicycle component 40 includes an interface that is configured to receive optical signals. In a third example, the wire 18C is a steel wire. In this case, the bicycle component 40 includes a mechanism that is driven by the force transmitted through the wire 18C.

Figure 5:
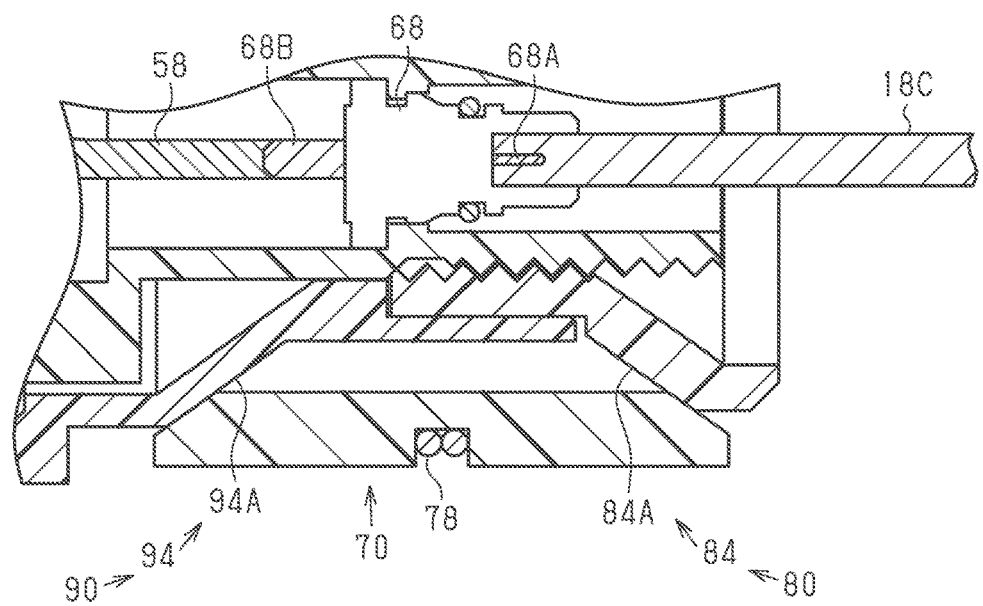
FIG. 5 is a partial enlarged cross-sectional view of a portion of the bicycle bar end attachment shown in FIG. 4 when a rotation member is rotated.

With reference to FIGS. 4 and 5, a method for attaching and removing the bar end attachment 50 will now be described.

The bar end attachment 50 is coupled to the handlebar 18, for example, through the procedures described below. First, the bar end attachment 50 is assembled as shown in FIG. 2. Then, the second portion 50B is inserted into the receiving portion 18A of the handlebar 18. Here, the second portion 50B is inserted into the receiving portion 18A until an end surface 92B of the exposed portion 92A contacts the end surface of the handlebar 18 at the receiving portion 18A. Next, the tool is fitted onto the exposed portion 92A. In this task, the tool accesses the exposed portion 92A outside the handlebar 18.

Then, the case 52 is fixed so that the main body 60 does not rotate integrally with the rotation member 90, and the rotation member 90 is rotated in a first rotation direction with the tool. The first rotation direction is the direction in which the compression member 80 rotates relative to the main body 60 and moves the first pressing surface 84 of the compression member 80 toward the second pressing surface 94 of the rotation member 90. When the rotation member 90 is rotated in the first rotation direction, the transmission structure 56 transmits the rotation of the rotation member 90 to the compression member 80. This rotates the compression member 80 relative to the main body 60 and moves the compression member 80 toward the rotation member 90 in the axial direction of the compression member 80.

The movement of the compression member 80 toward the rotation member 90 presses the first pressing surface 84 against the shoe 70. This moves the shoe 70, which is held between the first pressing surface 84 and the second pressing surface 94, along the first tapered surface 84A and the second tapered surface 94A toward the radially outer side of the handlebar 18. Movement of the shoe 70 toward the radially outer side of the handlebar 18 presses the shoe 70 against the inner circumferential surface of the handlebar 18. As the distance increases over which the compression member 80 moves relative to the main body 60, the distance decreases between the first pressing surface 84 and the second pressing surface 94 in the axial direction of the compression member 80. This increases the force that presses the shoe 70 against the inner circumferential surface of the handlebar 18. In this manner, the bar end attachment 50 presses the shoe 70 against the inner circumferential surface of the handlebar 18 in accordance with the degree of engagement of the main body 60 and the compression member 80. The rotation member 90 is rotated in the first rotation direction until the frictional force produced between the shoe 70 and the inner circumferential surface of the handlebar 18 fixes the bar end attachment 50 to the handlebar 18.

The bar end attachment 50 is removed from the handlebar 18, for example, through the procedures described below. First, the tool is fitted onto the exposed portion 92A. In this task, the tool accesses the exposed portion 92A outside the handlebar 18.

Then, the case 52 is fixed so that the main body 60 does not rotate integrally with the rotation member 90, and the rotation member 90 is rotated in a second rotation direction with the tool. The second rotation direction is the direction in which the compression member 80 rotates relative to the main body 60 and moves the first pressing surface 84 of the compression member 80 away from the second pressing surface 94 of the rotation member 90. When the rotation member 90 is rotated in the second rotation direction, the transmission structure 56 transmits the rotation of the rotation member 90 to the compression member 80. This rotates the compression member 80 relative to the main body 60 and moves the compression member 80 away from the rotation member 90 in the axial direction of the compression member 80.

As the compression member 80 moves away from the rotation member 90, the force decreases pressing the first pressing surface 84 against the shoe 70. This moves the shoe 70, which is held between the first pressing surface 84 and the second pressing surface 94, along the first tapered surface 84A and the second tapered surface 94A toward the radially inner side of the handlebar 18. Movement of the shoe 70 toward the radially inner side of the handlebar 18 decreases the force that presses the shoe 70 against the inner circumferential surface of the handlebar 18. As the distance increases over which the compression member 80 moves relative to the main body 60, the distance increases between the first pressing surface 84 and the second pressing surface 94 in the axial direction of the compression member 80. This decreases the force that presses the shoe 70 against the inner circumferential surface of the handlebar 18. The rotation member 90 is rotated in the second rotation direction until the frictional force produced between the shoe 70 and the handlebar 18 decreases to a level that allows the bar end attachment 50 to be removed from the handlebar 18. Then, the bar end attachment 50 is removed from the handlebar 18.

MODIFIED EXAMPLES

The present invention is not limited to the foregoing embodiment and various changes and modifications of its components can be made without departing from the scope of the present invention. Also, the components disclosed in the embodiment can be assembled in any combination for embodying the present invention. For example, some of the components can be omitted from all components disclosed in the embodiment. Further, components in different embodiments can be appropriately combined.

The transmission structure 56 can be configured in any manner. In a first example shown in FIG. 6, the transmitted portion 88 includes a slit 88B into which the transmitting portion 96 is inserted. The slit 88B includes two first restriction surfaces 88A. The two first restriction surfaces 88A are located at opposite sides of the slit 88B. The transmitting portion 96 projects from the second pressing surface 94 in the axial direction of the rotation member 90. The transmitting portion 96 includes two second restriction surfaces 96B. When the transmitting portion 96 of the rotation member 90 is inserted into the slit 88B, the second restriction surfaces 96B are opposed to the first restriction surfaces 88A in the rotation direction of the rotation member 90. In a second example, the second threaded portion 86 has the shape of a polygonal, three-dimensional object. Further, the transmitted portion 88 includes sides that are in correspondence with the polygonal shape. The inner surface of the transmitting portion 96 allows for accommodation of the second threaded portion 86 opposing the sides of the second threaded portion 86.

The bar end attachment 50 can be configured in any manner. In a first example, the bar end attachment 50 does not include the operation unit 30. This simplifies the structure of the bar end attachment 50. In a second example, the bar end attachment 50 includes a plurality of operation units 30. In this case, sufficient space is easily obtained around the handlebar 18.

The relationship of the circuit board 30B and the bicycle component 40 can be changed in any manner. In one example, the bicycle 10 does not include a wire connecting the circuit board 30B and the bicycle component 40. In this case, the circuit board 30B is configured to transmit wireless signals. For example, the circuit board 30B includes a wireless signal transmitter. Further, the bicycle component 40 is configured to receive the wireless signals of the circuit board 30B. The operation unit 30 and the bicycle component 40 are also configured to perform wireless communication.

The main body 60 can be configured in any manner. In a first example, the main body 60 includes a solid cylindrical portion instead of the tubular portion 62. In a second example, the main body 60 includes a solid coupling portion 64 instead of the hollow coupling portion 64. It is preferred that such structures be selected when the operation unit 30 is not connected to the wire 18C or when the bar end attachment 50 does not include the operation unit 30. Such structures increase the strength of the main body 60.

There is no limitation to the type of the electronic component 68. In a first example, the electronic component 68 includes a circuit board having the same functions as the circuit board 30B of the operation unit 30. In this case, the circuit board 30B can be omitted. In a second example, the electronic component 68 includes a circuit board connected to a bicycle component that differs from the bicycle component 40 and receives signals transmitted from the circuit board 30B.

The compression member 80 can be configured in any manner. In one example, the compression member 80 can include a solid compressing portion 82 instead of the hollow compressing portion 82. It is preferred that such a structure be selected when the operation unit 30 is not connected to the wire 18C or when the bar end attachment 50 does not include the operation unit 30. This structure increases the strength of the compression member 80.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top". "bottom", "side". "vertical", "horizontal", "perpendicular" and "transverse" as well as any other similar directional terms refer to those directions of a bicycle in an upright, riding position and equipped with the bicycle bar end attachment. Accordingly, these directional terms, as utilized to describe the bicycle bar end attachment should be interpreted relative to a bicycle in an upright riding position on a horizontal surface and that is equipped with the bicycle bar end attachment. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated. otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle bar end attachment comprising:
    a main body configured to be partially inserted into a handlebar of a bicycle, the main body including a first threaded portion;
    a shoe configured to be located between the main body and an inner surface of the handlebar while the main body is partially inserted into the handlebar, the shoe including a first end and a second end;
    a compression member including a second threaded portion that is threadedly engaged with the first threaded portion and a first pressing surface that contacts the first end of the shoe;
    a rotation member rotatably arranged relative to the main body and coaxial to the main body, the rotation member including an exposed portion that is accessible from outside the handlebar and a second pressing surface that contacts the second end of the shoe;
    a transmission structure arranged to transmit rotation of the rotation member to the compression member; and
    a fixing structure arranged to hold the shoe between the compression member and the rotation member and move the shoe in a radial direction of the handlebar to allow the main body to be fixed to the inner surface of the handlebar.

2. The bicycle bar end attachment according to claim 1, wherein
    the first threaded portion of the main body includes a male thread, and
    the second threaded portion of the compression member includes a female thread that is engageable with the male thread of the first threaded portion.

3. The bicycle bar end attachment according to claim 1, wherein
    the first pressing surface includes a first tapered surface that is inclined relative to an axis of the handlebar.

4. The bicycle bar end attachment according to claim 1, wherein
the second pressing surface includes a second tapered surface that is inclined relative to an axis of the handlebar.

5. The bicycle bar end attachment according to claim 1, wherein
the transmission structure includes a transmitted portion arranged in the compression member and a transmitting portion arranged in the rotation member,
the transmitted portion includes a first restriction surface, and
the transmitting portion includes a second restriction surface that opposes the first restriction surface in a rotation direction of the rotation member.

6. The bicycle bar end attachment according to claim 5, wherein
the transmitted portion projects from the first pressing surface in an axial direction of the compression member, and
the transmitting portion includes a slit into which the transmitted portion is inserted.

7. The bicycle bar end attachment according to claim 5, wherein
the transmitted portion includes a slit into which the transmitting portion is inserted, and
the transmitted portion projects from the second pressing surface in an axial direction of the rotation member.

8. The bicycle bar end attachment according to claim 1, wherein
the transmission structure is configured to relatively move the compression member and the rotation member in an axial direction of the compression member and the rotation member.

9. The bicycle bar end attachment according to claim 1, wherein
the main body includes an operation unit, which operates a bicycle component coupled to the bicycle.

10. The bicycle bar end attachment according to claim 9, wherein
the operation unit includes a circuit board.

11. The bicycle bar end attachment according to claim 10, wherein
the circuit board is configured to transmit a wireless signal.

12. The bicycle bar end attachment according to claim 9, wherein
the operation unit is configured to be connected to the bicycle component by a wire.

13. The bicycle bar end attachment according to claim 1, wherein
the main body includes a tubular portion, and
the first threaded portion is arranged on the tubular portion.

14. The bicycle bar end attachment according to claim 12, further comprising
an electronic component electrically connected to the wire,
the main body including a tubular portion, and
the electronic component is arranged in a space in the tubular portion.

15. The bicycle bar end attachment according to claim 9, wherein
the bicycle component includes at least one of a gear changer, a suspension, an adjustable seatpost, a power assist unit and a cycle computer.

16. A bicycle bar end attachment comprising:
a main body configured to be partially inserted into a handlebar of a bicycle, the main body including a first threaded portion and an operation unit, which operates a bicycle component coupled to the bicycle;
a shoe configured to be located between the main body and an inner surface of the handlebar to fix the main body to the handlebar while the main body is partially inserted into the handlebar;
a compression member including a second threaded portion that is threadedly engaged with the first threaded portion;
a tubular portion arranged on one of the main body and the compression member; and
an electronic component electrically connected to the operation unit, the electronic component being arranged in a space in the tubular portion;
the shoe being pressed against an inner surface of the handlebar in accordance with a degree of engagement of the main body and the compression member.

17. The bicycle bar end attachment according to claim 15, wherein
the first threaded portion of the main body includes a male thread, and
the second threaded portion of the compression member includes a female thread that is threadedly engaged with the male thread of the first threaded portion.

* * * * *